United States Patent
Han et al.

(10) Patent No.: US 9,890,749 B2
(45) Date of Patent: Feb. 13, 2018

(54) METHOD FOR CONTROLLING EXHAUST GAS RECIRCULATION SYSTEM FOR ENGINE

(71) Applicant: Hyundai Motor Company, Seoul (KR)

(72) Inventors: Dong Hee Han, Seoul (KR); Yoon Joo Kim, Yongin-si (KR); Kwanhee Choi, Seoul (KR); Hyun Jun Lim, Incheon (KR); Joowon Lee, Gwangju-si (KR); Nahm Roh Joo, Yongin-si (KR); Jong Il Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 130 days.

(21) Appl. No.: 14/878,790

(22) Filed: Oct. 8, 2015

(65) Prior Publication Data

US 2016/0153378 A1 Jun. 2, 2016

(30) Foreign Application Priority Data

Dec. 2, 2014 (KR) .......................... 10-2014-0170350

(51) Int. Cl.
*F02D 41/00* (2006.01)
*F02M 26/52* (2016.01)
(Continued)

(52) U.S. Cl.
CPC ........... *F02M 26/52* (2016.02); *F02D 41/005* (2013.01); *F02D 41/0047* (2013.01);
(Continued)

(58) Field of Classification Search
CPC ............... F02D 41/005; F02D 41/0065; F02D 41/0047; F02M 26/51; F02M 26/52
(Continued)

(56) References Cited

U.S. PATENT DOCUMENTS 8,224,592 B2 * 7/2012 De Cristofaro ......... F02D 41/18
702/45
8,511,154 B2 * 8/2013 Wang .................. F02D 41/0002
73/114.32
(Continued)

FOREIGN PATENT DOCUMENTS

JP 2004-197616 A 7/2004
JP 4194161 B2 12/2008
(Continued)

*Primary Examiner* — Sizo Vilakazi
*Assistant Examiner* — Kevin R Steckbauer
(74) *Attorney, Agent, or Firm* — Morgan, Lewis & Bockius LLP

(57) ABSTRACT

A method for controlling an exhaust gas recirculation (EGR) system which is provided with an intake throttle valve and an EGR valve driven by a motor may include detecting an engine speed and an amount of intake air for each cylinder of an engine while the engine is operating, determining an amount of air flow supplied to the engine based on the engine speed and the amount of intake air for each cylinder, determining an equivalent cross-section of the EGR valve based on the amount of air flow, determining an opening angle of the EGR valve based on the engine speed, the amount of intake air for each cylinder, the amount of air flow, and the equivalent cross-section of the EGR valve, and controlling the EGR valve according to the opening angle of the EGR valve.

3 Claims, 5 Drawing Sheets

(51) Int. Cl.
*F02M 26/51* (2016.01)
*F02D 41/18* (2006.01)

(52) U.S. Cl.
CPC ......... *F02D 41/0065* (2013.01); *F02M 26/51* (2016.02); *F02D 41/18* (2013.01); *Y02T 10/47* (2013.01)

(58) Field of Classification Search
USPC ...................................... 123/568.19, 568.21
See application file for complete search history.

(56) References Cited

U.S. PATENT DOCUMENTS

| | | | | |
|---|---|---|---|---|
| 8,646,271 | B2* | 2/2014 | Yasui | F02D 41/0047 60/605.2 |
| 8,738,273 | B2* | 5/2014 | Nam | F02D 41/0072 123/568.16 |
| 8,794,219 | B2* | 8/2014 | Yasui | F02D 41/005 123/568.11 |
| 9,097,215 | B2* | 8/2015 | Nam | F02D 41/0072 |
| 9,228,512 | B2* | 1/2016 | Chen | F02D 41/0077 |
| 9,297,319 | B2* | 3/2016 | Wang | F02D 41/0002 |
| 2009/0143998 | A1* | 6/2009 | De Cristofaro | F02D 41/18 702/45 |
| 2011/0308503 | A1* | 12/2011 | Yasui | F02D 41/005 123/568.21 |
| 2011/0313634 | A1* | 12/2011 | Yasui | F02D 41/0047 701/102 |
| 2012/0138027 | A1* | 6/2012 | Nam | F02D 41/0072 123/568.21 |
| 2012/0138028 | A1* | 6/2012 | Nam | F02D 41/0072 123/568.21 |
| 2012/0173118 | A1* | 7/2012 | Wang | F02D 41/0002 701/102 |
| 2012/0291534 | A1* | 11/2012 | Wang | F02D 41/0002 73/114.52 |
| 2015/0090236 | A1* | 4/2015 | Chen | F02D 41/0077 123/568.12 |
| 2015/0260116 | A1* | 9/2015 | Odello | F02D 41/0072 123/568.11 |
| 2015/0308332 | A1* | 10/2015 | Oh | F02B 37/24 60/605.2 |
| 2016/0032871 | A1* | 2/2016 | Keefover | F01P 3/14 123/559.1 |
| 2016/0146130 | A1* | 5/2016 | Haskara | F02D 41/005 701/108 |
| 2016/0146134 | A1* | 5/2016 | Wang | F02D 41/0052 701/108 |

FOREIGN PATENT DOCUMENTS

| | | |
|---|---|---|
| JP | 2014-047718 A | 3/2014 |
| KR | 1997-0070465 A | 11/1997 |
| KR | 2012-0062379 A | 6/2012 |
| KR | 10-1198807 B1 | 11/2012 |

* cited by examiner

METHOD FOR CONTROLLING EXHAUST GAS RECIRCULATION SYSTEM FOR ENGINE

CROSS-REFERENCE TO RELATED APPLICATION

The present application claims priority to Korean Patent Application No. 10-2014-0170350 filed Dec. 2, 2014, the entire contents of which is incorporated herein for all purposes by this reference.

BACKGROUND OF THE INVENTION

Field of the Invention

The present invention relates to a method for controlling an exhaust gas recirculation (EGR) system for an engine, and more particularly, to a method for controlling an EGR system that may accurately monitor and calculate complex flow of EGR gas by forming and applying a formula to form a 3-dimensional map based on an equivalent orthogonal cross-section, an amount of intake air for each cylinder, and an engine speed in an EGR system which controls an intake throttle valve and an EGR valve using one motor.

Description of Related Art

Exhaust gas of an engine contains a large amount of toxic matters, such as CO, HC, and NOx (nitrogen oxides). Particularly, when a combustion temperature of the engine increases, the amount of generation of NOx increases, so that it is necessary to lower a combustion temperature of the engine in order to reduce the amount of NOx contained in the exhaust gas.

Among the reasons for the increase of the combustion temperature of the engine, a major reason is that high temperature heat is momentarily generated according to an increase of a spread speed of flames ignited by a spark plug in a state where an air-fuel ratio of an air-fuel mixed gas inside a combustion chamber is in a rich state.

A method of lowering a combustion temperature of the engine in order to reduce the amount of NOx contained in the exhaust gas includes an exhaust gas recirculation (EGR) method of lowering a combustion temperature of an engine by decreasing a density of mixed gas without changing an inherent air-fuel ratio of the mixed gas by mixing a part of exhaust gas with fresh air and making the mixed gas flow in a combustion chamber.

The exhaust gas recirculation (EGR) method is used for improving fuel efficiency of a gasoline engine, as well as reducing the amount of NOx contained in the exhaust gas. By using the exhaust gas recirculation (EGR) method, it is possible to simultaneously decrease the amount of NOx and advance ignition timing while avoiding a knocking generation region. Accordingly, it is possible to improve output of the engine and fuel efficiency.

In order to accurately control the recirculation of the exhaust gas, the amount of EGR gas recirculated to the intake manifold needs to be accurately controlled.

Among methods of controlling the recirculation of the exhaust gas, a method determines a present driving region, after pre-setting a displacement amount of a low pressure EGR valve for each driving region of an engine and forming a map table based thereon, extracts a control value from the map table, and then controls the low pressure EGR valve based on the extracted control value.

In the method, since it is required to make an EGR gas extracted from an exhaust system (extraction point) flow in an inlet (inflow point) of a compressor, a pressure difference between the two points may be insufficient for the EGR.

As shown in FIG. 1, although the insufficient pressure difference may be complemented by throttling a front side the compressor (not shown), since the amount of EGR gas non-linearly increases due to the throttling, it is difficult to accurately control the amount of EGR gas.

In FIG. 1, reference numbers 10, 20, and 30 refer to an intake throttle valve for throttling, an EGR valve for controlling the amount of the EGR gas, and a motor for controlling opening angles of the valves 10 and 20, respectively.

According to the conventional structure in which one motor such as the motor 30 controls the intake throttle valve 10 and the EGR valve 20, the amount of EGR gas passed through the EGR valve 20 may be one-dimensionally represented through the following equation.

$$\dot{m}_{EGR} = A_{RED}\sqrt{\frac{2\gamma}{(\gamma-1)RT_{EGRV}}} P_{EGRV} \Psi_{EGR}$$

$$\Psi_{EGR} = \begin{cases} \sqrt{\left(\frac{P_{COMP}}{P_{EGRV}}\right)^{\frac{2}{\gamma}} - \left(\frac{P_{COMP}}{P_{EGRV}}\right)^{\frac{\gamma+1}{\gamma}}}, & \frac{P_{COMP}}{P_{EGRV}} > 0.52 \\ 0.2588, & \frac{P_{COMP}}{P_{EGRV}} < 0.52 \end{cases}$$

($A_{RED}$: equivalent cross-section, $\gamma$: specific heat ratio)

However, according to the equation, since the pressure difference ($P_{COMP}/P_{EGRV}$) between the opposite sides of the EGR valve 20 is small, and parameters of the equation are associated with the two valves 10 and 20 and are associated with intake/exhaust flow in which pressure pulsation exists, control based on an equation $\theta = f(A_{RED})$ related to an opening angle ($\theta$) of a generally-used valve and an equivalent cross-section ($A_{RED}$) is difficult, as shown in FIG. 2.

The reason why the control based on the equation ($\theta = f(A_{RED})$) is difficult is that an average pressure of the pressures ($P_{COMP}$, $P_{EGRV}$) according to the amount of the air flow ($\dot{m}_{AIR}$) is changeable, and a pulsation phase of the pressures ($P_{COMP}$, $P_{EGRV}$) according to an engine speed (N) is changeable.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method for controlling an EGR system that may accurately monitor and calculate complex flow of EGR gas by forming and applying a formula to form a 3-dimensional map based on an equivalent orthogonal cross-section, an amount of intake air for each cylinder, and an engine speed in an EGR system which controls an intake throttle valve and an EGR valve using one motor.

According to various aspects of the present invention, a method for controlling an exhaust gas recirculation (EGR) system which is provided with an intake throttle valve and an EGR valve driven by a motor may include detecting, by an engine controller, an engine speed and an amount of intake air for each cylinder of an engine while the engine is operating, determining, by the engine controller, an amount of air flow supplied to the engine based on the engine speed and the amount of intake air for each cylinder, determining, by the engine controller, an equivalent cross-section of the EGR valve based on the amount of air flow, determining, by the engine controller, an opening angle of the EGR valve based on the engine speed, the amount of intake air for each cylinder, the amount of air flow, and the equivalent cross-section of the EGR valve, and controlling, by the engine controller, the EGR valve according to the opening angle of the EGR valve.

The amount of air flow may be determined through the following equation:

$$\dot{m}_{AIR} = \frac{n}{2}\frac{2\pi N}{60}M_{AIR},$$

wherein $\dot{m}_{AIR}$ is the amount of air flow, n is a number of cylinders of the engine, N is the engine speed, and $M_{AIR}$ is the amount of intake air for each cylinder.

The equivalent cross-section ($A_{RED}$) of the EGR valve may be determined through the following equation:

$$A_{RED} = \frac{\dot{m}_{EGR}}{\sqrt{\frac{2\gamma}{(\gamma-1)RT_{EGRV}}}P_{EGRV}\Psi_{EGR}},$$

wherein $A_{RED}$ is an axis of the equivalent cross-section of the EGR valve, $$\Psi_{EGR} = \begin{cases} \sqrt{\left(\frac{P_{COMP}}{P_{EGRV}}\right)^{\frac{2}{\gamma}} - \left(\frac{P_{COMP}}{P_{EGRV}}\right)^{\frac{\gamma+1}{\gamma}}}, & \frac{P_{COMP}}{P_{EGRV}} > 0.52 \\ 0.2588, & \frac{P_{COMP}}{P_{EGRV}} < 0.52 \end{cases},$$

and γ is a specific heat ratio.

The opening angle of the EGR valve may be calculated through the following equation: $\theta = f_1(A_{RED}, \dot{m}_{AIR}(N, M_{AIR}), N) = f_2(A_{RED}, M_{AIR}, N)$, wherein $A_{RED}$ is an axis of the equivalent cross-section of the EGR valve, $\dot{m}_{AIR}$ is the amount of air flow, N is the engine speed, and $M_{AIR}$ is the amount of intake air for each cylinder.

The opening angle of the EGR valve may be formed as a 3-dimensional map with respect to the equation for calculating the opening angle of the EGR valve.

The 3-dimensional map may include an axis of the engine speed, an axis of the amount of intake air for each cylinder of the engine, and the axis of the equivalent cross-section of the EGR valve.

According to various embodiments of the present invention, a method for controlling an EGR system may be provided to accurately monitor and calculate complex flow of EGR gas by forming and applying a formula to form a 3-dimensional map based on an equivalent orthogonal cross-section, an amount of intake air for each cylinder, and an engine speed in an EGR system which controls an intake throttle valve and an EGR valve using one motor, thereby improving control stability and reliability of the engine.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
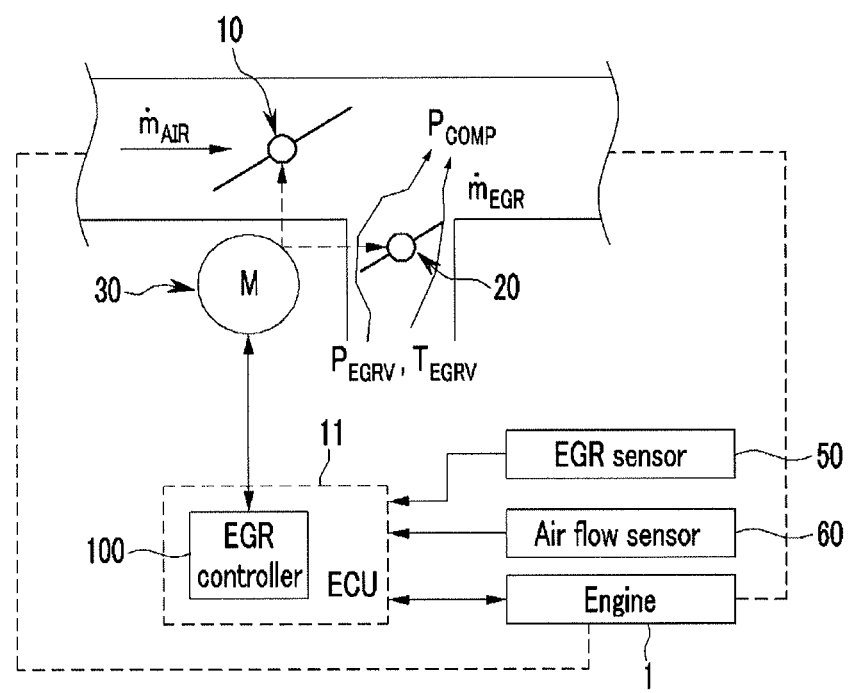
FIG. 3 is a block diagram for implementing an exemplary method for controlling an EGR system according to the present invention.

FIG. 3 is a block diagram of a system for implementing a method for controlling an EGR system according to various embodiments of the present invention.

Referring to FIG. 3, the system for implementing the method for controlling the EGR system according to various embodiments of the present invention may include an EGR controller 100 configured to control general operation of the EGR system; an EGR sensor 50 configured to detect whether EGR is performed, and an air flow sensor 60 configured to detect an amount of air. In the system, an EGR valve 20 and an intake throttle valve 10 are controlled by one motor 30.

Figure 1:
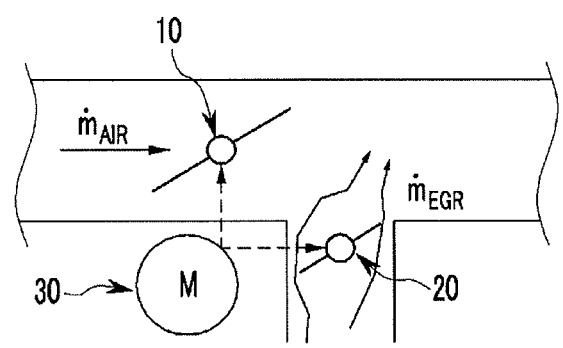
FIG. 1 is a schematic diagram illustrating a typical exhaust gas recirculation (EGR) system which controls an intake throttle valve and an EGR valve using one motor according to the related art.
Figure 2:
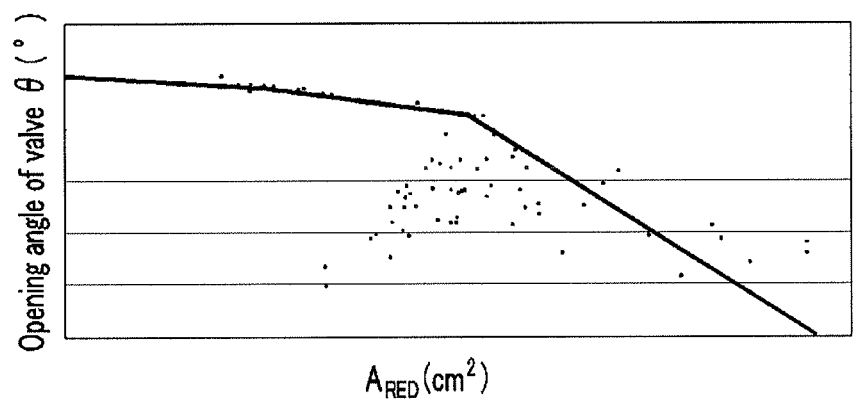
FIG. 2 is a graph for explaining a drawback of a method for controlling an EGR system according to the related art.

The motor 30, the EGR valve 20, the intake throttle valve 10, the EGR sensor 50, and the air flow sensor 60 may be similar to those shown in FIG. 1 or may be those typically applied in the conventional art.

The EGR controller 100 may be one or more microprocessors and/or hardware including a microprocessor that can be operated by a predetermined program, wherein the predetermined program may include a series of commands for executing the method for controlling the EGR system to be described later according to various embodiments of the present invention.

The EGR controller 100 may be included in an engine electronic control unit (ECU) 11 configured to control an engine 1 as shown in FIG. 3, or may include the ECU 11.

Hereinafter, a method for controlling an EGR system according to various embodiments of the present invention will be described in detail with reference to the accompanying drawings.

Figure 4:
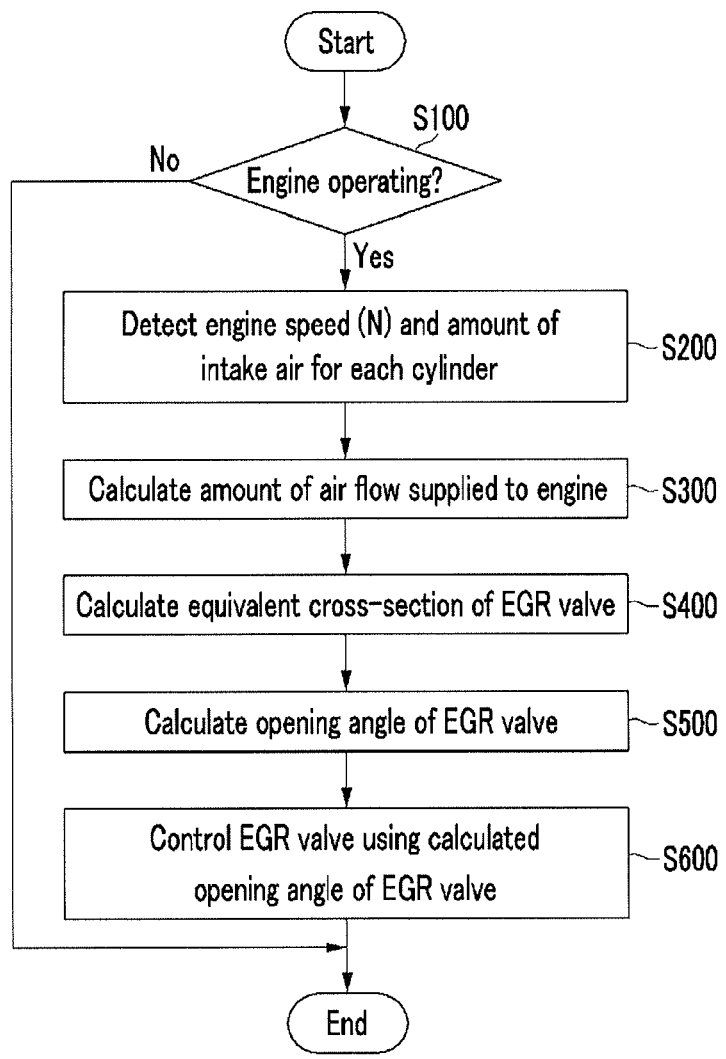
FIG. 4 is a flowchart of an exemplary method for controlling an EGR system according to the present invention.

FIG. 4 is a flowchart of a method for controlling an EGR system according to various embodiments of the present invention.

Referring to FIG. 4, the EGR controller 100 determines whether the engine 1 is operating (S100). While the engine 1 is operating, the EGR controller 100 performs EGR control.

The operation of the engine 1 may be detected or determined through signals outputted from the ECU 11, as is well-known to a person skilled in the art.

When the operation of the engine 1 is detected or determined at step S100, the EGR controller 100 detects an engine speed (N) of the engine 1 and an amount ($M_{AIR}$) of intake air for each cylinder of the engine 1 (S200).

The engine speed (N) may be detected or determined through the ECU 11, and the amount ($M_{AIR}$) of intake air for each cylinder may be detected or determined by the air flow sensor 60 and/or through the ECU 11.

When the engine speed (N) and the amount ($M_{AIR}$) of intake air for each cylinder is detected, the EGR controller 100 calculates an amount ($\dot{m}_{AIR}$) of air flow supplied to the engine 1 based on the engine speed (N) and the amount ($M_{AIR}$) of intake air for each cylinder (S300). For example, the amount ($\dot{m}_{AIR}$) of air flow may be calculated through the following equation.

$$\dot{m}_{AIR} = \frac{n}{2} \frac{2\pi N}{60} M_{AIR}$$

(where n is the number of cylinders of the engine)

When the amount ($\dot{m}_{AIR}$) of air flow is calculated, the EGR controller 100 calculates an equivalent cross-section ($A_{RED}$) of the EGR valve 20 based on the amount ($\dot{m}_{AIR}$) of air flow (S400). For example, the equivalent cross-section ($A_{RED}$) may be calculated through the following equation.

$$A_{RED} = \frac{\dot{m}_{EGR}}{\sqrt{\frac{2\gamma}{(\gamma-1)RT_{EGRV}}} P_{EGRV} \Psi_{EGR}}$$

$$\Psi_{EGR} = \begin{cases} \sqrt{\left(\frac{P_{COMP}}{P_{EGRV}}\right)^{\frac{2}{\gamma}} - \left(\frac{P_{COMP}}{P_{EGRV}}\right)^{\frac{\gamma+1}{\gamma}}}, & \frac{P_{COMP}}{P_{EGRV}} > 0.52 \\ 0.2588, & \frac{P_{COMP}}{P_{EGRV}} < 0.52 \end{cases}$$

(where $\gamma$ is the specific heat ratio, R is a gas constant of the EGR gas, $P_{EGRV}$ is a front pressure of the EGR valve, $P_{COMP}$ is a rear pressure of the EGR valve, and $T_{EGRV}$ is a temperature of the EGR gas)

When the equivalent cross-section ($A_{RED}$) is calculated, the EGR controller 100 calculates an opening angle ($\theta$) of the EGR valve 20 through the following equation based on the engine speed (N), the amount ($M_{AIR}$) of intake air for each cylinder, the amount ($\dot{m}_{AIR}$) of air flow, and the equivalent cross-section ($A_{RED}$) of the EGR valve 20 (S500), and then controls the EGR valve 20 according to the calculated opening angle ($\theta$) of the EGR valve 20 (S600).

$$\theta = f_1(A_{RED}, \dot{m}_{AIR}(N, M_{AIR}), N) = f_2(A_{RED}, M_{AIR}, N).$$

Figure 5:
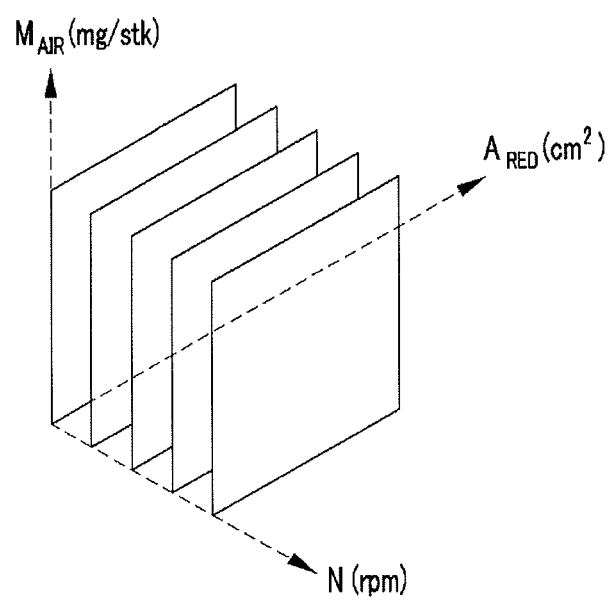
FIG. 5 is a 3-dimensional map formed by an exemplary method for controlling an EGR system according to the present invention.

As shown in FIG. 5, the opening angle ($\theta$) of the EGR valve 20 may be formed as a 3-dimensional orthogonal map with respect to the equation for calculating the opening angle ($\theta$) of the EGR valve 20, wherein the 3-dimensional orthogonal map may have an axis of the engine speed (N), an axis of the amount ($M_{AIR}$) of intake air for each cylinder of the engine 1, and an axis of the equivalent cross-section ($A_{RED}$) of the EGR valve 20.

The 3-dimensional orthogonal map may be formed with respect to every predetermined engine speed to accurately set values of the opening angle of the EGR valve 20.

Accordingly, according to various embodiments of the present invention, it is possible to accurately monitor and calculate complex flow of EGR gas by forming and applying a formula to form a 3-dimensional map based on an equivalent orthogonal cross-section, an amount of intake air for each cylinder, and an engine speed in an EGR system which controls an intake throttle valve and an EGR valve using one motor, thereby improving control stability and reliability for the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for controlling an exhaust gas recirculation (EGR) system which is provided with an intake throttle valve and an EGR valve driven by a motor, the method comprising:

detecting, by an engine controller, an engine speed and an amount of intake air for each cylinder of an engine while the engine is operating;

determining, by the engine controller, an amount of air flow supplied to the engine based on the engine speed and the amount of intake air for each cylinder;

determining, by the engine controller, an equivalent cross-section of the EGR valve based on an amount of an EGR gas passed through the EGR valve;

determining, by the engine controller, an opening angle of the EGR valve based on the engine speed, the amount of intake air for each cylinder, the amount of air flow, and the equivalent cross-section of the EGR valve; and controlling, by the engine controller, the EGR valve according to the opening angle of the EGR valve, wherein the opening angle of the EGR valve is calculated through the following equation: $\theta = f_2(A_{RED}, M_{AIR}, N)$, wherein $A_{RED}$ is an axis of the equivalent cross-section of the EGR valve, N is the engine speed, and $M_{AIR}$ is the amount of intake air for each cylinder, wherein the opening angle of the EGR valve is formed as a 3-dimensional map with respect to the equation for calculating the opening angle of the EGR valve, and wherein the 3-dimensional map includes an axis of the engine speed, an axis of the amount of intake air for each cylinder of the engine, and the axis of the equivalent cross-section of the EGR valve.

2. The method of claim 1, wherein the amount of air flow is determined through the following equation:

$$\dot{m}_{AIR} = \frac{n}{2} \frac{2\pi N}{60} M_{AIR},$$

wherein $\dot{m}_{AIR}$ is the amount of air flow, n is a number of cylinders of the engine, N is the engine speed, and $M_{AIR}$ is the amount of intake air for each cylinder.

3. The method of claim 1, wherein the equivalent cross-section of the EGR valve is determined through the following equation:

$$A_{RED} = \frac{\dot{m}_{EGR}}{\sqrt{\frac{2\gamma}{(\gamma-1)RT_{EGRV}}} P_{EGRV} \Psi_{EGR}},$$

and wherein:

$A_{RED}$ is the equivalent cross-section of the EGR valve, $$\Psi_{EGR} = \begin{cases} \sqrt{\left(\frac{P_{COMP}}{P_{EGRV}}\right)^{\frac{2}{\gamma}} - \left(\frac{P_{COMP}}{P_{EGRV}}\right)^{\frac{\gamma+1}{\gamma}}}, & \frac{P_{COMP}}{P_{EGRV}} > 0.52 \\ 0.2588, & \frac{P_{COMP}}{P_{EGRV}} < 0.52 \end{cases},$$

$\gamma$ is a specific heat ratio, R is a gas constant of the EGR gas, $P_{EGRV}$ is a front pressure of the EGR valve, $P_{COMP}$ is a rear pressure of the EGR valve, and $T_{EGRV}$ is a temperature of the EGR gas.

* * * * *